United States Patent [19]
Llewellyn et al.

[11] 3,861,522
[45] Jan. 21, 1975

[54] COMPARTMENTED PACKAGE HAVING VARIABLE-VOLUME COMPARTMENTS

[75] Inventors: Walter E. Llewellyn, Hammond, La.; Frank M. Willis, Hedgesville, W. Va.

[73] Assignee: E. I. du Pont de Nemours and Company, Wilmington, Del.

[22] Filed: Aug. 16, 1972

[21] Appl. No.: 281,166

[52] U.S. Cl. .................. 206/219, 229/56, 206/223
[51] Int. Cl. ...................... B65d 77/08, B65d 31/12
[58] Field of Search ............... 206/47 A, 219, 223; 229/56; 220/20

[56] References Cited
UNITED STATES PATENTS

| | | |
|---|---|---|
| 2,609,880 | 9/1952 | Dyer .......................... 206/47 A X |
| 3,000,495 | 9/1961 | Downing ........................ 229/56 UX |
| 3,054,703 | 9/1962 | Brasure ...................... 206/DIG. 34 |
| 3,145,838 | 8/1964 | Van Deusen ..................... 206/47 A |
| 3,261,494 | 7/1966 | Walker, Jr. ........................ 220/20 |
| 3,266,671 | 8/1966 | Gelpey ............................. 222/94 |
| 3,302,410 | 2/1967 | McLean ....................... 206/47 UX |
| 3,737,027 | 6/1973 | Ball ............................... 206/47 A |

Primary Examiner—Leonard Summer

[57] ABSTRACT

A compartmented package, e.g., a rock bolt resin package, in which a longitudinal diaphragm, made of film, is sealed to the inner wall of a circular tubular member, also made of film, to form at least two continuous longitudinal linear junctures therebetween in a manner such that the volumes of the resulting compartments are variable. A two-compartment package having infinite relative volume variability in both compartments is preferred.

13 Claims, 3 Drawing Figures

COMPARTMENTED PACKAGE HAVING VARIABLE-VOLUME COMPARTMENTS

BACKGROUND OF THE INVENTION

This invention relates to an improved package wherein materials, especially reactive materials, are stably maintained in separate compartments, e.g., an improved rock bolt resin package.

In end-use applications which operate on the basis of a physical change effected in a mixture by a rapid chemical reaction of components thereof, e.g., in the anchoring of a structural element within a surrounding structure by curing of a soft resin composition around the element at ambient temperature to cause the resin to set up hard, it is expedient to pack certain components of the mixture in separate compartments in a unitary package so that the components can be brought together easily in the required proportions by rupture of the compartment wall between them at, or just prior to, the time when the physical change is to be effected, i.e., when the mixture is in proper position at the location of use. Bringing the components together in this manner prevents the physical change from occurring before the mixture has been properly positioned, in which case the mixture would be incapable of functioning as designed.

In one particular end-use of the above type, the quick-setting property of certain resin systems is utilized to fix anchor bolts in drill holes, such bolts being used, for example, as strengthening members in rock formations. First, one or more packages containing a polymerizable resin formulation are inserted into a drill hole, followed by the bolt or reinforcing rod. The latter compresses the resin package(s) towards the bottom of the hole and tears the package(s), and, when rotated, mixes the components thereof, whereupon the resin cures and hardens.

For resin systems which are quick-setting, e.g., on the order of a few seconds, at room temperature, the need for dual-compartment packages to prevent setting before the bolt is in place has been recognized. In such systems, the polymerizable resin composition generally is located in one compartment, and a catalyst composition in the other, and the package is broken and the compositions are mixed at the time that setting is desired.

Various dual-compartment packages have been described heretofore. However, although these packages are capable of providing the necessary compartmenting of components, the packages suffer from certain serious disadvantages when considered from the viewpoint of the degree of efficiency they offer in use, the degree of versatility of their design, and their degree of adaptability to a rapid rate of package formation and loading, i.e., to a continuous mechanized packaging process. Packages intended to be applicable to drill-hole use should be (1) circular so as to conform to drill-hole geometry and thus result in more efficient use of the resin in the drill holes; and (2) rigid so as to reduce the complexity of the drill-hole-loading operation, rigid cartridges or packages requiring no special insertion devices or special cartridge modifications to facilitate drill-hole loading, as do limp packages.

An important consideration in assessing the merits of a package is the rate at which such a package can be made and filled, i.e., how amenable the package design is to rapid, continuous mechanical forming and filling operations. Another important factor to be weighed in the case of multi-compartmented packages is whether or not the design offers any degree of versatility with respect to varying of the compartment volumes (i.e., the volumes of the components therein) in a package of a given overall size and shape, or whether such volumes are fixed, in which case the processing equipment used needs to be modified to produce a variety of compartment-size combinations with each given overall package size.

Many of the compartmented packages known in the art consist of an inner compartment sealed within an outer compartment, e.g., an inner flexible envelope within an outer flexible envelope, both envelopes sealed along three or all four edges at the envelope's periphery, as described in U.S. Pat. No. 3,302,410. This type of package is slack, rather than rigid. The forming and filling of other dual-compartment packages of this general overall design, e.g., those described in U.S. Reissue Pat. No. 25,869 and U.S. Pat. No. 3,385,427, also entail complicated assembly procedures. Also, with many of the types of packages described above, for a given overall package size and shape, and given dimensions of the compartment-forming wall, the volume of material which can be packed in the different compartments cannot be practically modified. The sealed-envelope type of compartmented package described in U.S. Pat. No. 3,087,606 is a flexible package specifically designed to be kneaded so as to selectively rupture the inside partition without opening of the package.

SUMMARY OF THE INVENTION

This invention provides a compartmented package, especially suitable for reactive-component mixtures of fluent materials, which allows variation of the compartmental volume ratio without a concomitant variation in the overall package size and shape.

The package comprises (a) a tubular member made of pliable film material and having a substantially circular transverse crosssection; (b) a diaphragm made of pliable film material longitudinally disposed within the tubular member substantially from one end thereof to the other, the tubular member and diaphragm both preferably being formed from a single web of film material, e.g., a polymeric linear terephthalate ester, and both preferably having substantially the same rupture strength; the diaphragm being sealed to the wall of the tubular member so as to form at least two continuous linear junctures, e.g., heat seals, which are substantially parallel to the longitudinal axis of the tubular member, and which extend substantially from one end thereof to the other, the transverse dimension, or width, of the diaphragm between successive junctures being at least equal to the length of an arc of the circle of transverse cross-section of the tubular member, which arc is defined by the junctures and is no longer than one-half the circumference of the circle; and (c) fluent materials of different composition within the tubular member in adjacent compartments therein, each of the compartments being defined by the diaphragm, a pair of the linear junctures, and a portion of the tubular member therebetween, materials of different composition being located in different compartments, e.g., an ambient-temperature-setting, polymerizable resin composition in one compartment and a composition which catalyzes the polymerization of the resin composition in an adjacent compartment, and the quantity of fluent materials in the tubular member being sufficient to produce a substantially circular transverse cross-section therein, and preferably a rigid structure; the tubular member and the diaphragm being cooperatively gathered and closed at each end, e.g., by encircling closure means such as a clip or band.

BRIEF DESCRIPTION OF THE DRAWING

In the accompanying drawing, which illustrates specific embodiments of this invention.

In the drawing, like numerals designate similar parts.

DETAILED DESCRIPTION OF THE INVENTION

The basic structural components of the compartmented package of this invention are a tubular member and a diaphragm longitudinally disposed therein substantially throughout the tubular member's length and sealed to the wall of the tubular member at two or more continuous linear junctures which are substantially parallel to the tubular member's longitudinal axis and which extend throughout its length, the tubular member and diaphragm being jointly gathered and closed at both ends to hold fluent materials within compartments therein. Each compartment in the package is defined by the diaphragm (or a portion thereof), a pair of successive linear junctures, and a portion of the tubular member between junctures, the diaphragm being common to adjacent compartments. The material of construction of the tubular member and diaphragm is a relatively thin, pliable film material, and the loaded package adopts a substantially circular transverse cross-section by virtue of being sufficiently packed with the fluent materials. When the tubular member is not loaded, the diaphragm is in a slack condition, having between any given pair of successive junctures a transverse dimension which is at least equal, and preferably is about equal, to the length of an arc of the circle of transverse cross-section of the tubular member, this arc being defined by the pair of successive junctures and being equal to, or less than, one-half the circumference of this circle. As a result, while the circular tubular cross-section is maintained, the pliable diaphragm is movable in transverse planes and, upon loading, can adopt a configuration and position conforming to the volumes of materials loaded into each of the two compartments of which it is a part. Thus, although the total volume of the package is fixed by the area of the circular cross-section and the length of the tubular member, the volume ratio of the materials loaded into the respective compartments can be varied by virtue of the mobility and pliability of the diaphragm, which is able to adopt a position and configuration such as to produce a compartmental volume ratio equal to the volume ratio of the materials loaded into the compartments.

Figure 1:
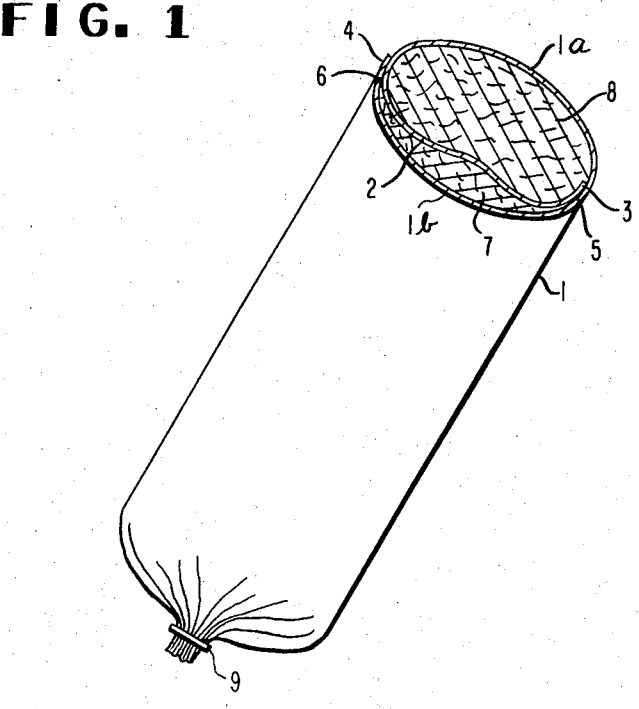
FIG. 1 is a perspective view of a portion of a two-compartment package of the present invention, which package has been cross-sectioned in the transverse direction so as to reveal more fully the internal structure thereof.

The compartmental volume variability feature of the package of the invention, as well as other features thereof, can be seen by reference to the drawing. In FIG. 1, a tubular member 1 of substantially circular transverse cross-section and a diaphragm 2 have been constructed from a single web of pliable film material having an inner edge 3 and an outer edge 4 by forming the web into a convoluted tube having a partially single-ply and partially double-ply wall. The two plies of the double-ply portion of the tubular wall have been sealed together at diametrically opposed continuous linear junctures or seals 5 and 6 near edges 3 and 4, respectively, the inner ply having formed diaphragm 2, and the outer ply having formed a semicylindrical portion of tubular member 1.

For purposes of simplicity in describing the geometry of the package of the invention, in the transverse cross-section of tubular member 1 the circles formed by the inner and outer tubular member walls are considered herein as essentially a single circle in view of the relatively thin wall. With this understanding, it is seen that junctures 5 and 6 define two arcs, 1a and 1b, of the circle, each arc being equal to one-half the circumference of the circle. The transverse dimension, or width, of diaphragm 2 between junctures 5 and 6 is substantially equal to the lengths of arcs 1a and 1b.

When tubular member 1 is not loaded, diaphragm 2 is in a slack condition and can be moved in transverse planes through all positions intermediate a semicylinder in which arc 1b lies and one in which arc 1a lies.

Compartments 7 and 8, which are defined by diaphragm 2, junctures 5 and 6, and the semicylinders in which arcs 1b and 1a lie, respectively, are packed with fluent materials, e.g., fluent solid or semi-solid materials, the material in compartment 7 being different in composition from that in compartment 8. Because of the mobility of pliable diaphragm 2 when the package is unfilled, the volume of material which can be packed into compartments 7 and 8 can vary from a value between 0 percent and 100 percent of the total volume of material packed into tubular member 1, the percent (of total) volume in one compartment being equal to 100 minus the percent (of total) volume in the other. The total volume and packing density are sufficient to maintain the circular cross-section of tubular member 1. Thus, the volumes of compartments 7 and 8 and the configuration of diaphragm 2 are defined by the volumes of solid materials in compartments 7 and 8, respectively.

At each end of the compartmented tubular member, one of which is shown in FIG. 1, the end portions of tubular member 1 and of diaphragm 2 are collectively gathered together and closed by closure means 9.

Figure 2:
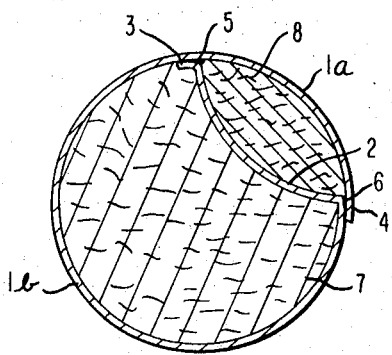
FIG. 2 is a transverse cross-sectional view of a two-compartment package of the invention having a different degree of compartmental volume variability than the package shown in FIG. 1.

In the package shown in FIG. 2, junctures 5 and 6 define two arcs, 1a and 1b, of unequal length, the arc which is not longer than one-half the circle's circumference, i.e., arc 1a, being equal in length to about one-fourth the circumference, and the width of diaphragm 2 being substantially equal to the length of arc 1a. In this instance, because diaphragm 2 has a smaller width relative to the circumference of the circle of transverse cross-section, and therefore a more limited degree of mobility in transverse planes, the degree of variability of the volumes of the compartments and their contents is substantially less than in the package shown in FIG. 1. The volume of material which can be packed into compartment 7 can vary up to 100 percent of the total volume packable into tubular member 1. Compartment 8 in this case is shown packed to its maximum volume, i.e., diaphragm 2 is fully extended.

Figure 3:
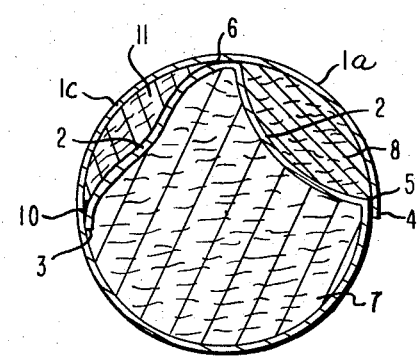
FIG. 3 is a transverse cross-sectional view of a three-compartment package of the invention.

The package shown in FIG. 3 has three compartments, 7, 8, and 11, and is likewise constructed from a single web of film material. Diaphragm 2, in this case, is sealed to the wall of tubular member 1 at three linear junctures 5, 6, and 10. The arcs which are defined by junctures 5 and 6, and junctures 6 and 10, and are no longer than one-half the circumference of the circle of transverse cross-section of tubular member 1, i.e., arcs 1a and 1c, respectively, are each equal in length to about one-fourth the circumference of the circle, and the width of diaphragm 2 between the two pairs of successive junctures 5 and 6, and 6 and 10, is equal to the lengths of arcs 1a and 1c. The volume of material which can be packed into compartment 7 can vary up to 100 percent of the total volume packable in tubular member 1. The maximum volume of material which can be packed into each of compartments 8 and 11 is substantially less than 100 percent of the total volume packable in tubular member 1. Compartment 8 is shown packed to its maximum volume, and compartments 7 and 11 to less than their maximum volumes.

The unique features of the package of the invention are not dependent on the method by which the package is manufactured and any one of various techniques can be employed to produce the package, including formation of the tubular member and diaphragm from different webs of film material, subsequent insertion of the diaphragm into the tubular member and sealing thereof to the tubular member wall, followed by filling of the resulting compartmented tubular member and closing of its ends. However, an outstanding feature of the present package is that it is uniquely adapted to being produced in a continuous series, i.e., with continuous advancement of the packaging film material during the packaging steps, preferably from a single web of film material for reasons of greater ease of handling in this mode of operation. Since the rate of production of packages made in this manner is substantially higher than that attainable with discontinuous methods, the single-web package is preferred over one made from more than one web of film material.

The preferred package of the invention can be produced by forming a continuous web of pliable film material into a continuously advancing convoluted tube having a partially single-ply and partially double-ply wall, feeding fluent materials into separate compartments in the tube which are formed by sealing the inner and outer plies so as to form continuous linear junctures therebetween, dividing the compartmented tube at predetermined spaced intervals by gathering of the tube material and forming a constricted area therein, applying a pair of successive encircling closure means to each constricted area, and severing the constricted portion of the compartmented tube between each pair of closure means to separate the successviely formed packages. This process can be carried out using packaging machinery such as that described in U.S. Pat. Nos. 2,831,302, issued Apr. 22, 1958, 3,149,447, issued Sept. 22, 1964, and 3,324,621 issued June 13, 1967, all assigned to Oscar Mayer & CO., for producing single-compartment packages, with certain component modifications that are required to produce the novel package of this invention. The disclosures of the above-cited patents are incorporated herein by reference.

The following example describes the preparation of a package such as that shown in FIG. 1.

EXAMPLE

A convoluted tube having a half single-ply and half double-ply wall is formed from a continuous 4.5-inch-wide, 0.0015-inch-thick, web of biaxially oriented, heat-set polyethylene terephthalate film. A modified form of the machinery described in the aforementioned patents is employed. As described in U.S. Pat. No. 2,831,302, and particularly with reference to FIG. 3 therein, the web 20 moves from a supply roll upwardly and over a curved forming plate 30 and down around a tubular filling mandrel 31. The forming plate is cut and shaped to form a collar around the mandrel which reverses the direction of the web and guides the edges thereof downwardly into tube-forming relation around the mandrel. To form the convoluted tube described above, the collar around mandrel 31 is replaced by a convoluted cylindrical forming member made from a flat plate having the general form of an angle-truncated isosceles right triangle having a 5-inch base and an arcuate portion opposite thereto, the latter being the arc of a circle whose radius is 1½ inches and whose center is on a 2-15/16-inch line which connects the center of the arc and the base (normal thereto) so as to divide the latter into 2¼ inch and 2¾ inch sections. The sides of the triangle are tangents to the arc, and are truncated normal to the base. The plate is rolled to form a convolute, with the truncated edge which is 2¼ inches from the arc-bisecting line as the inside edge, so as to produce an inner diameter of approximately thirteen-sixteenths inch and an outer diameter of 1 inch.

Filling mandrel 31 (outer diameter one-half inch) extends vertically through the inner tubular portion of the convoluted forming member, and a filling tube (outer diameter three-sixteenth inch) extends vertically between overlapping portions of the convolute. Each filling element is connected by a supply tube to a pump which delivers fluent solid material thereto, the ends of the filling elements being located below feeding rollers 45.

As the film advances over and into the convoluted forming cylinder around the filling elements, it is formed into a convoluted tube having a half single-ply and half double-ply wall, and a seven-eighths-inch outer diameter. The advancing convoluted tube moves at a speed of 45 feet per minute into the path of two hot air jets, each of which is directed toward a circular zone in the tube's outer surface in the two-ply half of the tube one-fourth-inch away from the inner and outer edges of the web. These zones, which are diametrically opposed, overlie corresponding zones of the inner surfaces of the tube to which benzyl alcohol has been applied, the alcohol having been applied to the web prior to its having reached the forming cylinder in a manner such that each alcohol-treated zone in the convoluted tube formed is a continuous ½-inch-wide strip-like zone in a surface of one ply which faces the surface of the other. The air velocity from the air jets is 300 feet per second, the air temperature is 900°F, the diameter of the air heater tip is one-eighth inch, and the distance between the heater tip and the film surface is one-eighth inch. The hot air jets produce continuous, 3/16-inch-wide, diametrically opposed linear seals between the plies in the underlying benzyl-alcohol-treated zones in the polyethylene terephthalate film. The inner ply becomes a slack diaphragm which can be moved in transverse planes, and the outer ply, together with the half single-ply portion of the tube, forms the tubular member of circular transverse cross-section. The width of the diaphragm is substantially equal to the length of each arc of the circle of transverse cross-section defined by the linear seals.

The material delivered to mandrel 31 is a fluent paste-like solid consisting of a polyester resin (an inhibited reactive mixture of a resin prepared by reacting maleic anhydride and a saturated polycarboxylic acid with one or more glycols, and 35 percent styrene, based on the resin), a major amount of an inert filler, a promoter, a thixotropic thickening agent, and a dye. The material delivered to the smaller filling tube is a fluent paste-like solid consisting of a catalyst or promoter for the resin system, an inert filler, and a thixotropic thickening agent. The materials are fed into both compartments of the heat-sealed convoluted tube at a uniform rate such that the weight ratio of material in compartment 8 to that in compartment 7 (FIG. 1) is about 12 to 1 (about 9 to 1 by volume).

The compartmented tube is constricted at desired intervals as described in U.S. Pat. No. 2,831,302 and also closed and severed as described therein. The resulting packages, which typically are about 18 or 27 inches long, are firm, rigid, and uniform in diameter. The inter-reactivity of the components of the two compartments of the package is retained upon prolonged storage, e.g., for periods of 6 months to 1 year at 95° F, indicative of the strength, inertness, and imperviousness of the polyethylene terephthalate film, the high strength of the heat seals, and the temperature stability of the resin formulation.

In a typical use for anchoring a rock bolt in a 1-inch-diameter, 5-feet-long vertical drill hole in a mine roof, two of the packages, one 18 inches and the other 27 inches long, are inserted sequentially into the hole. A rock bolt then is pushed up into the hole, thereby breaking both packages and contacting the bottom of the hole. After insertion, the bolt is rotated at an average speed of about 100 revolutions per minute so as to mix the resin component and catalyst component. The mixture gels about 40 seconds after mixing. In a standard pull test carried out with loads increased until failure, the resin holds and failure occurs in the bolt in tension.

The tubular member and diaphragm of the package of the invention both are made of pliable film material which is strong enough to protect the package contents under the conditions the package will encounter in use, but at the same time is sufficiently thin and pliable that it will not interfere with the utility of the package contents, e.g., with the reaction of reactive components therein when the package has been deliberately broken. Any film material which affords the required properties can be employed, e.g., polyethylene, cellophane, vinyl polymers, polymeric linear terephthalate esters such as polyethylene terephthalate, etc. For packaging rock bolt resin systems, polyethylene terephthlate film is especially preferred because of its strength, inertness with respect to the package contents, and imperviousness to vapors such as those which may issue in the case of styrene-containing systems. the polyethylene terephthalate should be in a biaxially oriented, heat-set form as described in U.S. Pat. No. 2,820,735, issued Jan. 21, 1958 to L. E. Amborski.

The tubular member and diaphragm need not be made from the same film composition, but preferably are so made as this simplifies the packaging process. Also, although the rupture strengths of the tubular member and diaphragm can differ, different strengths are not required, e.g., for rock bolt resin packages, and, for reasons of better economics, it is preferred that the structural components of the package both have substantially the same ruture strength. For the same reason, although these two components can have different thicknesses, film material of substantially the same thickness is preferred for both.

Alternative methods of producing the package of the invention in the machinery described in U.S. Pat. No. 2,831,302 involve (a) forming a prefolded web of film into a continuously advancing tube and sealing near each edge of the web, and (b) advancing two webs of film together, one web forming a tube having a single-ply wall and the other forming an internal semicylinder sealed near its edges to the wall of the tube, and the edges of the tube also sealed together.

The procedure used to seal the diaphragm to the tubular member wall to form the continuous linear junctures therebetween can be any means which can provide seals of the required strength and tightness with the particular film used. On the basis of convenience and seal strength, heat seals are preferred; such as those produced by the electronic sealing mechanism described in the aforementioned U.S. Pat. No. 2,831,302, heated rolls or bars which apply sealing pressure as well as heat, or hot air jets. For sealing packages wherein the tubular member and diaphragm are made of oriented polyethylene terephthalate film, which film cannot be effectively heat-sealed to itself, the film can be provided with a coating of a heat-sealable film in the zones where the linear junctures are to be made, but a preferred procedure is to apply a solvent such as benzyl alcohol to those zones and heat-sealing in the solvent-treated zones, as described in the aforementioned U.S. Pat. No. 2,820,735 and in the above example. Polyethylene terephthalate film self-sealed in this manner is preferred over a laminated terephthalate film wherein the bond zone between the terephthalate and the other film may fail and in effect destroy the seal.

Heat seals preferably are made at a slight distance from the edges of the web so as to avoid the application of heat to the singleply portion of the tubular member, which condition could cause a burnthrough of the film. A distance of about from one-sixteenth to one-fourth inch between the seal and the edge of the web is satisfactory. The width of the juncture is not critical, widths of about one-sixteenth to one-fourth inch usually being satisfactory. One of the linear junctures can be made by an indirect sealing of the diaphragm to the wall of the tubular member. However, direct sealing as described above is preferred for forming all linear junctures as this assures the greatest control of compartmentalization.

The width of the diaphragm between successive longitudinal junctures is at least equal to the length of an arc of the circle of transverse cross-section of the tubular member, this arc being defined by the junctures and being no longer than one-half the circumference of the circle. This feature assures the volume variability of the compartments. Although the diaphragm width can be longer than the arc specified, the preferred process for making the package, i.e., the continuous process described in the Example, produces a diaphragm which is substantially as wide as the arc is long, and such a package therefore is preferred.

The number of compartments in the package of the invention depends on the specific intended use for the package. Any number of compartments can be provided by forming the required number of continuous linear junctures, i.e., two junctures for two compartments, three junctures for three compartments, etc. in the preferred package. The maximum possible number of compartments naturally is less for smaller-diameter pacakges considering the mechanical difficulties associated with forming and filling the necessarily smaller compartments. As a practical matter, packages of about one inch or less in diameter generally will have no more than two compartments.

The total volume of fluent materials in the package is one which, together with their packing density, is sufficient to maintain the substantially circular transverse cross-section of the tubular member, a desired feature for many uses, especially for packages to be inserted into drill holes. The preferred package is one which is firm and rigid so as to be easily loaded into drill holes. The particular volume ratio of compartmented components employed also depends on the package's intended use. In the case of a package which holds the components of rock bolt resin systems, for example, the volume ratio of polymerizable resin composition (in one compartment) to catalyst composition (in a different compartment) generally is about from 5/1 to 25/1. Any package in which the linear junctures are sufficiently separated to provide a long enough circular arc and wide enough diaphragm to accommodate the smaller-volume component can be employed. Although a limited-variability package such as that shown in FIG. 2 can be sufficiently adaptable for many requirements, the infinitely variable volume package shown in FIG. 1 is preferred because it is suitable for packaging any combination of volumes without limitation.

The compartmented package contains fluent materials, i.e., flowable solids or liquids such as pumpable materials, granular materials, or extrudable paste-like materials, materials of different composition being located in different compartments. Inasmuch as the compartmental feature of the package is utilized to its best advantage with materials which, when united, form mixtures containing reactive components, the material in any compartment preferably is reactive with, or influences the reactivity of, the material in an adjacent compartment. In the compartmented package, the components are storage-stable. In the preferred package, when the diaphragm is broken and the components are brought together, reaction occurs. The spepcific compositions present in the compartments can vary widely, depending on the package's intended use. A package adapted to be inserted into, and subsequently broken in, a drill hole, and its contents mixed and hardened so as to anchor a rock bolt in the drill hole, preferably contains an ambient-temperature-setting, polymerizable resin composition, e.g., a composition which includes an unsaturated polymerizable polyester resin and a monomeric polymerizable ethylenic compound, in one compartment, and, in a separate compartment, a composition which catalyzes or initiates the polymerization of the resin composition, e.g., a peroxide. Polyester resin compositions and systems such as those described in U.S. Pat. No. 2,480,928, issued Sept. 6, 1949, to E. C. Hurdis, and U.S. Pat. Nos. 2,676,947, issued Apr. 27, 1954, 2,698,312, issued Dec. 28, 1954, 2,740,765, issued Apr. 3, 1956, and 3,010,943, issued Nov. 28, 1961, all to E. E. Parker, are typical of those which can be used effectively in the compartmented rock bolt resin package of this invention. For a given combination of ingredients, the specific quantitative make-up of the resin component and catalyst component can be varied to provide a shelf life, degree of reactivity when mixed, and set strength according to specific requirements.

We claim:

1. A compartmented package comprising
   a. a tubular member made of pliable film material and having a substantially circular transverse cross-section;
   b. a diaphragm made of pliable film material longitudinally disposed within said tubular member substantially from one end thereof to the other and sealed to the wall thereof so as to form two substantially diametrically opposed continuous linear junctures which are substantially parallel to the longitudinal axis of said tubular member and which extend substantially from one end thereof to the other; and
   c. fluent materials of different composition within said tubular member in two adjacent compartments therein, each of said compartments being defined by said diaphragm, said two linear junctures and a portion of said tubular member therebetween, materials of different composition being located in different compartments, the quantity of said materials in said tubular member being sufficient to produce a substantially circular transverse cross-section therein, the transverse dimension of said diaphragm between said junctures being at least equal to the length of an arc of the circle of transverse cross-section of said tubular member, which arc is defined by said junctures, and said diaphragm being adapted to move freely in transverse planes with respect to said tubular member before said compartments have been loaded so that, for a given total volume of said tubular member, the volumes of the different compartments may be made infinitely variable; said tubular member and said diaphragm being cooperatively gathered and closed at each end.

2. A package according to claim 1 wherein the transverse dimension of said diaphragm between successive junctures is substantially equal to the length of said arc.

3. A package according to claim 1 wherein the fluent material in one of said compartments is reactive with, or influences the reactivity of, that in an adjacent compartment.

4. A package according to claim 1 wherein said pliable film material is inert with respect to said fluent solid materials and impervious to vapors issuable therefrom, and said tubular member and said diaphragm have substantially the same rupture strength.

5. A package according to claim 4 wherein said tubular member and said diaphragm are portions of the same web of film material.

6. A package according to claim 4 wherein said film material is thermoplastic and said linear junctures are heat seals.

7. A package according to claim 4 wherein said film material comprises a polymeric linear terephthalate ester, and said linear junctures are heat seals.

8. A compartmented package adapted to be inserted into, and subsequently broken in, a drill hole and its contents mixed and subsequently hardened so as to anchor a rock bolt in the drill hole, said package comprising a. a tubular member made of pliable film material and having a substantially circular transverse cross-section;

b. a diaphragm of pliable film material longitudinally disposed within said tubular member substantially from one end thereof to the other and sealed to the wall thereof so as to form two substantially diametrically opposed continuous linear junctures which are substantially parallel to the longitudinal axis of said tubular member and which extend substantially from one end thereof to the other; and c. fluent materials within said tubular member in two adjacent compartments therein, each of said compartments being defined by said diaphragm, said two linear junctures, and a portion of said tubular member therebetween, the fluent material in one compartment including an ambient-temperature-setting, polymerizable resin composition and that in the other a composition which catalyzes the polymerization of said resin composition, said film material being inert with respect to said fluent materials and impervious to vapors issuable therefrom, the quantity of said material in said tubular member being sufficient to produce a substantially circular cross-section therein, the transverse dimension of said diaphragm between said junctures being at least equal to the length of an arc of the circle of transverse cross-section of said tubular member, which arc is defined by said junctures, and said diaphragm being adapted to move freely in transverse planes with respect to said tubular member before said compartments have been loaded so that, for a given total volume of said tubular member, the volumes of the two compartments may be made infinitely variable; said tubular member and said diaphragm being cooperatively gathered and closed at each end.

9. A package according to claim 8 wherein the transverse dimension of said diaphragm between said junctures is substantially equal to the length of said arc.

10. A package according to claim 8 wherein said tubular member and said diaphragm are portions of the same web of film material.

11. A package according to claim 10 wherein said diaphragm is sealed to the wall of said tubular member near the edges of said web.

12. A package according to claim 11 wherein said film material comprises a polymeric linear terephthalate ester and said linear junctures are heat seals.

13. A package according to claim 12 wherein the fluent material in one compartment includes an unsaturated polymerizable polyester resin, a monomeric polymerizable ethylenic compound, a gelation inhibitor, a gelation promoter, an inert filler, and a thickening agent, and the fluent material in the other compartment includes a peroxide catalyst, an inert filler, and a thickening agent.

* * * * *